(12) United States Patent
Staples et al.

(10) Patent No.: US 7,408,560 B2
(45) Date of Patent: Aug. 5, 2008

(54) SYSTEM AND METHOD FOR DYNAMIC PROPAGATION AND DISPLAY OF GRAPHICAL EDITS

(75) Inventors: Daniel C. Staples, Madison, AL (US); Kristopher C. Kasprzak, Madison, AL (US); Aditya N. Gurushankar, Huntsville, AL (US); Venugopala Krishna Vytla, Madison, AL (US); Mallikarjuna Gandikota, Madison, AL (US); Prasad Pingali, Madison, AL (US)

(73) Assignee: Siemens Product Lifecycle Management Software Inc.

( * ) Notice: Subject to any disclaimer, the term of this patent is extended or adjusted under 35 U.S.C. 154(b) by 874 days.

(21) Appl. No.: 10/382,092

(22) Filed: Mar. 5, 2003

(65) Prior Publication Data

US 2004/0174382 A1 Sep. 9, 2004

(51) Int. Cl.
*G09G 5/00* (2006.01)
*G06T 15/00* (2006.01)
*G06T 17/00* (2006.01)

(52) U.S. Cl. ............... 345/619; 345/419; 345/420

(58) Field of Classification Search ........ 345/619, 345/771–772, 418, 660, 647–648, 672, 764, 345/769, 419, 420, 440–443; 715/771, 772, 715/764, 769
See application file for complete search history.

(56) References Cited

U.S. PATENT DOCUMENTS

| | | | |
|---|---|---|---|
| 5,754,181 A | 5/1998 | Amdursky et al. | |
| 5,757,678 A | 5/1998 | Leeke | |
| 5,894,310 A | 4/1999 | Arsenault et al. | |
| 6,219,055 B1 * | 4/2001 | Bhargava et al. | 345/420 |
| 6,392,645 B1 | 5/2002 | Han et al. | |
| 6,489,957 B1 * | 12/2002 | Han et al. | 345/420 |
| 7,079,990 B2 * | 7/2006 | Haller et al. | 345/420 |
| 2003/0071810 A1 * | 4/2003 | Shoov et al. | 345/420 |
| 2003/0085889 A1 * | 5/2003 | Chin et al. | 345/419 |
| 2004/0153296 A1 * | 8/2004 | Landers et al. | 703/2 |
| 2004/0174363 A1 * | 9/2004 | Staples et al. | 345/442 |
| 2005/0212797 A1 * | 9/2005 | Lee et al. | 345/419 |

OTHER PUBLICATIONS

Wolfgang Sohrt, "Interaction with Constraints in Three-Dimensional Modeling", Master's Thesis, University of Utah, Mar. 1991.
Ivan E. Sutherland et al., "Sketchpad A Man-Machine Graphical Communication System", American Federation of Information Processing Societies AFIPS, Proceedings of the Spring Joint Computer Conference, May 1963, pp. 329-346.
C. Hsu et al., "A Constraint-Based Manipulator Toolset for Editing 3D Objects", Association for Computing Machinery, Proceedings of the Fourth Symposium on Solid Modeling and Applications, May 14, 1997, pp. 168-180.
Wolfgang Sohrt et al., "Interaction with Constraints in 3D Modeling", Symposium on Solid Modeling Foundations and CAD/CAM Applications, Jun. 5, 1991, pp. 387-396.

* cited by examiner

*Primary Examiner*—Chante Harrison

(57) ABSTRACT

A system and method for improving user feedback during graphical edits by dynamically propagating each incremental edit through the dependency tree and displaying real-time updates to the graphic representation as the updates are being made. By updating the image through the entire dependency tree at the earliest possible time, without waiting for the user to complete his edit or to perform an action which manually indicates an update, the user is given improved feedback during the editing process.

30 Claims, 5 Drawing Sheets

SYSTEM AND METHOD FOR DYNAMIC PROPAGATION AND DISPLAY OF GRAPHICAL EDITS

TECHNICAL FIELD OF THE INVENTION

The present invention is directed, in general, to computer graphics and in particular in the area of editing geometry in the context of an associative or history-based system.

BACKGROUND OF THE INVENTION

The computer has greatly affected essentially all forms of information management, including the graphical editing and computer aided design and drafting (CAD) tools. Some simpler geometric modeling computer program products are two dimensional, providing only length and width dimensions of objects, while more complex and powerful computer program products provide three dimensional editing and visualization.

Three dimensional geometric modeling programs can generate a scene or part which can comprise one or more constituent 3D solid shapes. For example, a scene featuring a simple table would comprise a solid shape for each leg of the table, as well as a solid shape for a flat table top. The geometric modeling computer program typically has an executable object used to define and generate each solid shape. The object for each solid shape can have several components, the components being a combination of executable code and data structure. For example, a boundary representation ("B-rep") component includes a data structure describing the geometry and topology data for the solid shape (e.g., length, width, depth, and coordinates of the solid part).

Most three dimensional geometric modeling programs employ a feature-based parametric modeling technique. In feature-based parametric modeling, the executable object for each solid shape has not only a boundary representation component, but also a history or creation component, referred to herein as a "feature tree" or "dependency tree," which includes a data structure reflecting how a solid shape has been created. That is, the dependency tree includes data which indicates an order or chronological sequence of steps employed to construct the solid shape. For a simple solid block, for example, the history may indicate that the solid block began as a simple two dimensional rectangle that was extruded into a third dimension. U.S. Pat. No. 5,894,310, incorporated herein by reference, discloses solid shapes having various other components in addition to boundary representation and historical components: a visual component; a physical component; a functional component; and a behavioral component. Similarly, U.S. Pat. No. 6,392,645, incorporated herein by reference, describes a method of converting between a feature-based data structure and a direct-face data structure in graphical modeling.

Typically, when the user wants to modify a feature-based solid shape by changing any aspect of the solid shape, the feature-based parametric modeling technique re-evaluates the entire solid shape, e.g., goes through the entire CGS dependency tree in order to revise the part in accordance with the change. For example, if the user wanted to lengthen the table top of the table described above, another solid shape would be added adjacent to the previous table top. In so adding another solid shape corresponding to the increased length of the table top, another step is added to the CSG history. Alternatively, the user may modify the 2D profile of the table top and let the program to re-evaluate the solid shape of the table.

Often, a modification attempted by a user in a feature-based parametric modeling may provide a result different than that expected by the user, since existing solutions do not provide complete graphical feedback while edits are being made in the context of a dependency tree. Instead, most edits require a "roll back" of the tree to the state wherein the geometry was originally created. As the edit is performed, you cannot see the geometry that came "after" the operation currently under edit. Upon completing the edit, the tree rolls forward, taking into account the changes you have made. In the context of the "table-top" example, while the user is re-sizing the table top, the rest of the table remains static until the operation is complete, and then the remainder of the table graphic is updated.

In existing solutions, in some isolated cases, such as editing dimensional values, the edit can be made while seeing the portions of the model that are "downstream" of the current edit (i.e. in a non-rolled-back-state). However, the computations of downstream features to reflect their change as a result of the edit is delayed during this edit. It is only when the user completes the edit that he can see the results of the edit, in the form of a static update to the rest of the model.

In all cases, the existing solutions prohibit a productive and dynamic feedback loop between the user and the system. Since the user must wait to see the results of his edit, he may make incorrect decisions, lacking full information. Additionally, many types of edits, such as adjusting the shape of a surface require strong visual feedback to make the correct edit. While rubber-banding may be provided in isolated instances, such as updating a surface while the curve is being edited, no known system updates the entire tree, or significant portions of it, during the edit. So, for example, if the user wants to evaluate how his edit to a curve affects the rounds that depend on the surface generated by the curve, he cannot see this interactively in current solutions.

There is, therefore, a need in the art for an improved system and method for dynamic propagation and display of graphical edits in history-based modeling systems.

SUMMARY OF THE INVENTION

To address the above-discussed deficiencies of the prior art, it is a primary object of the present invention to provide an improved system and method The preferred embodiment provides a system and method for improving user feedback during graphical edits by dynamically propagating each incremental edit through the dependency tree and displaying real-time updates to the graphic representation as the updates are being made. By updating the image through the entire dependency tree at the earliest possible time, without waiting for the user to complete his edit or to perform an action which manually indicates an update, the user is given improved feedback during the editing process.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
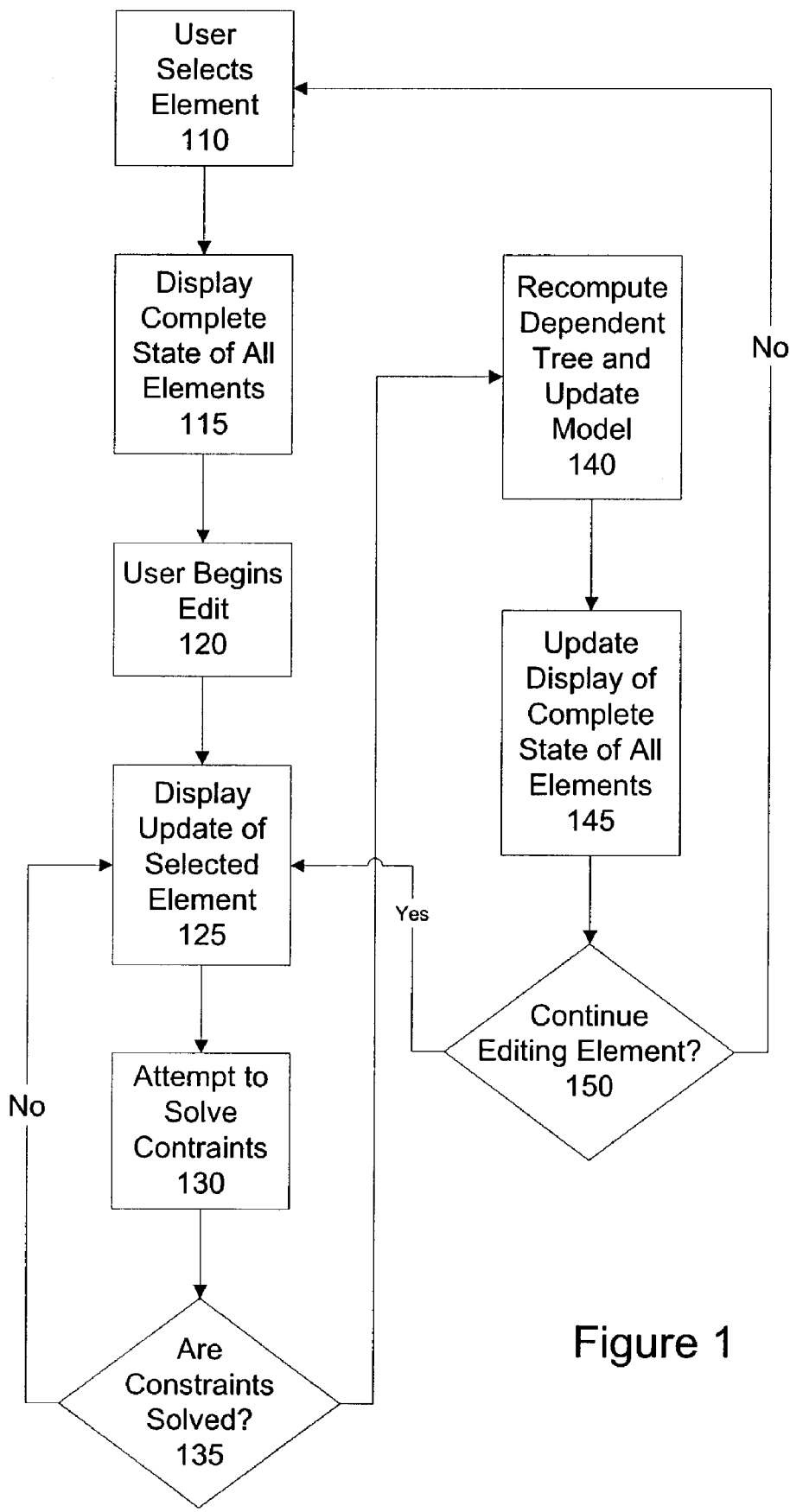
FIG. 1 depicts a flowchart of a process in accordance with the preferred embodiment of the present invention.

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Definitions: Following are short definitions of the usual meanings of some of the technical terms which are used in the present application. (However, those of ordinary skill will recognize whether the context requires a different meaning.) Additional definitions can be found in the standard technical dictionaries and journals.

The preferred embodiment provides a system and method for improving user feedback during graphical edits by dynamically propagating each incremental edit through the dependency tree and displaying real-time updates to the graphic representation as the updates are being made. By updating the image through the entire dependency tree at the earliest possible time, without waiting for the user to complete his edit or to perform an action which manually indicates an update, the user is given improved feedback during the editing process.

In this document, it is assumed that the reader is of skill in the art, and is familiar with common terms and acronyms as used in the art. In particular, it is noted that a dependency tree contains sequential lists of features, states, or events relating to a graphical element or elements. As used in this document, "upstream" refers to features, states, or events which have a chronologically earlier position in the dependency tree, and "downstream" refers to features, states, or events which have a chronologically later position in the dependency tree. Further, the "dependent tree" refers to the tree of features, states, or events which are downstream in the dependency tree, as later events are naturally dependent on earlier events.

The preferred embodiment solves the problem of lack of useful feedback by dynamically updating up to the entire dependency tree, and the corresponding graphical display, on each incremental mouse movement. The techniques and methods described herein can be implemented in any conventional and suitable data processing system.

According to the preferred embodiment, a dynamic edit command is a service command within the SELECT command. Activating this command will display the selected feature's profile/sketch elements and their constraints in 3D. In this state, only profile/sketch elements and dimensional constraints can be selected in 3D space. Upon selecting any particular element, the system will display the corresponding handles for that element in 3D space. The handles are transient graphical elements, which can be picked and dragged to change the shape and size of the curve. The constraint solver will solve modifications to the curve and hence the modifications are applied to the profile/sketch. Any modifications to the profile/sketch will notify the associative system and hence the dependent elements of the model will be recomputed.

FIG. 1 shows a flowchart of a process in accordance with the preferred embodiment. Here, the user is assumed already to be in the process of working with a multiple-feature object in a CAD system.

First, the user selects the element he wishes to edit (step 110), using a mouse or other conventional input device, and is graphically shown the ways in which it can be edited. Note that although any number of input devices can be used, the following example will refer to mouse movements.

At this point, the system is displaying all elements in their current, complete state (step 115). The user begins his edit, typically by performing a "click-and-drag" action with his mouse (step 120). In this case, the "mouse button down" is the event which signals the beginning of the edit.

As the user performs his edit, at each discrete mouse movement, the selected element is updated on the display (step 125). At the same time, the system attempts to solve the constraints for all elements in the dependency tree which are downstream of the selected element, according to the current elements current, edited state (step 130).

If the constraints cannot yet be successfully solved (step 135), the system accepts the next mouse movement, and continues to update the selected element until the constraints can be solved (returning to step 125).

When constraints are solved (step 135), the entire dependent tree is recomputed and the model is updated (step 140). As soon as this is done, the system updates the display of all elements in their current state, including all changes caused by the user's edits (step 145). In this way, the full display is updated at the earliest possible moment, providing complete, real-time feedback to the user.

Finally, if the user is continuing to edit the element (step 150), then the process continues as above (returning to step 125). Otherwise, the user has completed his editing process, which would typically be indicated by lifting the mouse button or other conventional ways, and he may go on to select another element to edit (returning to step 110), or perform some other task.

If the user drags the feature so that it would result in a failure, the failure is "flagged" on the display in realtime; in the preferred embodiment, an exclamation point is displayed next to the feature in the dependency tree. If the feature is then dragged so that it is valid, it automatically "heals" and the failure indication is removed.

Figure 2:
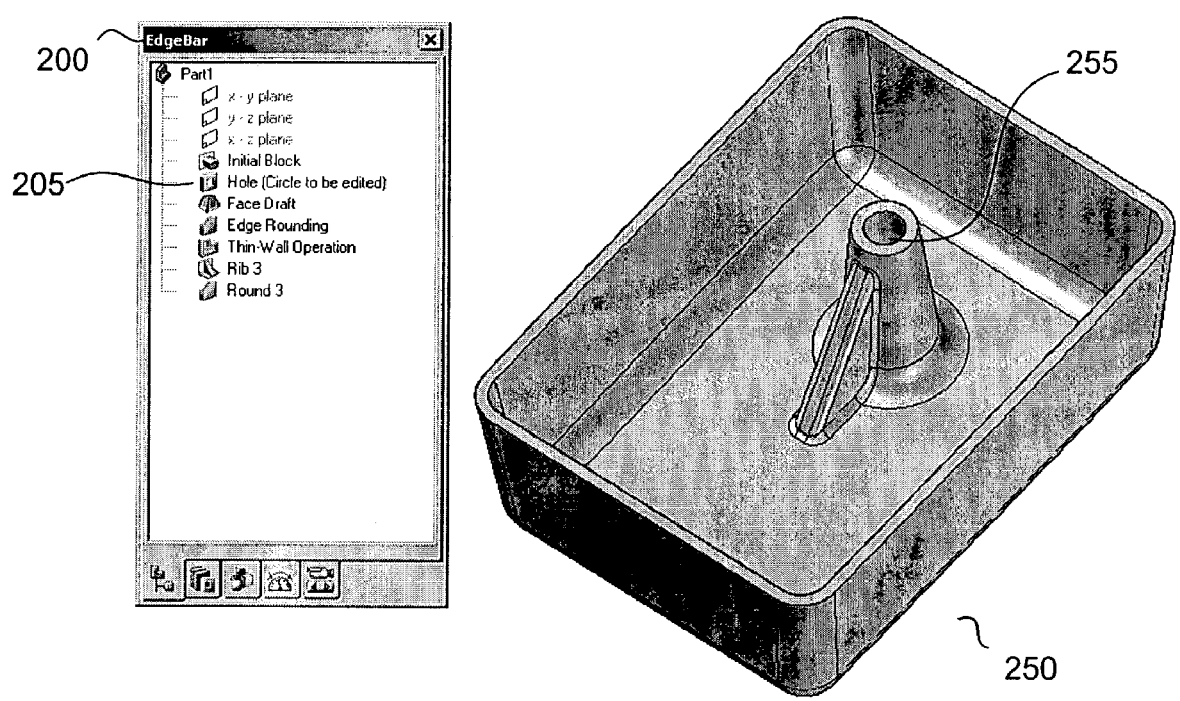
FIG. 2 depicts an exemplary model and associated dependency tree in accordance with a preferred embodiment of the present invention.

FIG. 2 shows an exemplary model 250 and associated dependency tree 200. Model 250 was constructed by creating a block adding a hole followed by features that rely on the geometric characteristics of the hole. Note the hole feature 205 in dependency tree 200, and the features below or downstream of it. Hole feature 205 corresponds to the hole structure 255 in model 250.

As is seen, hole feature 205 occurs early in the dependency tree. All the features below it depend on it for their geometric state. By editing the circle to different values, either by dragging a handle-point with a mouse or by scrolling the dimension value incrementally, a variety of different geometries result, as shown in FIGS. 3A-3C.

Figure 3A:
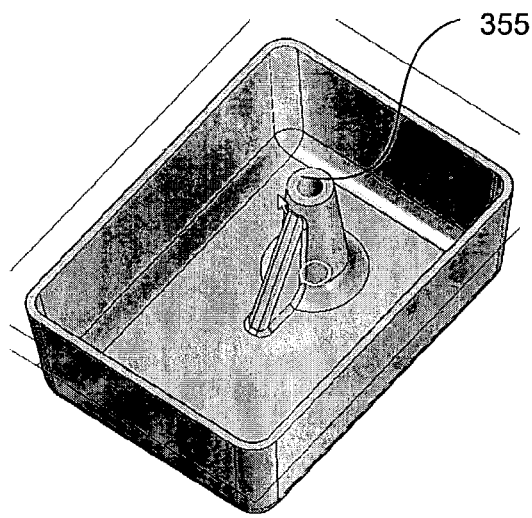
FIGS. 3A-3C depict an exemplary edit to a graphical model in accordance with a preferred embodiment of the present invention.
Figure 3B:
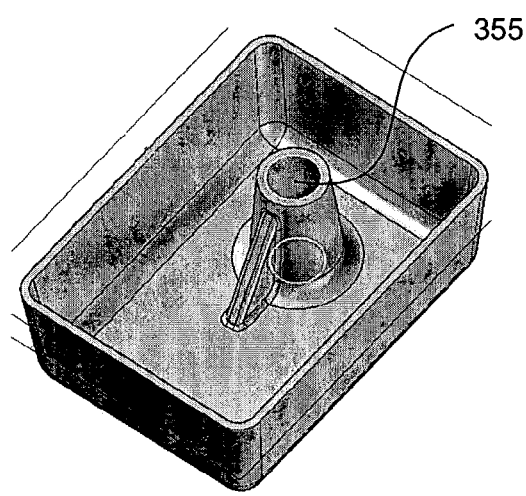
Figure 3C:
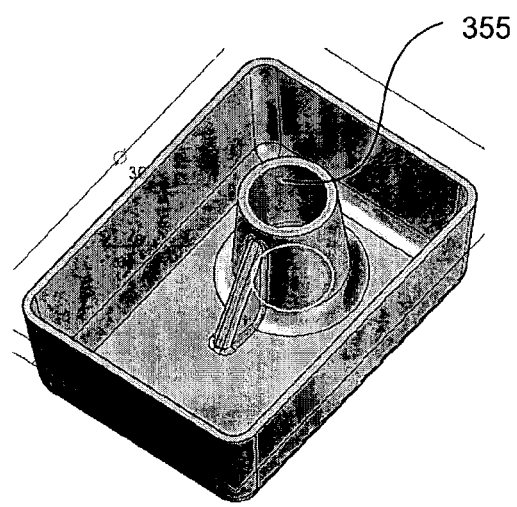

FIGS. 3A-3C illustrate a dimensional change to the hole diameter. In each of these figures, note that hole structure 355 has a changed diameter. All subsequent features must recompute to display the correct geometry, based on the change in circle diameter of the hole. According to the preferred embodiment, unlike in conventional systems, the user sees each of these solutions in rapid visual sequence, as frames in a movie—where each frame follows the previous by a very short interval, giving the perception of animating through a series of results.

Although, in the preferred embodiment, the entire dependency tree is updated "live" while the user is performing his edits, the invention is not restricted to that domain. Indeed, a smaller portion of the feature-tree may updated instead to improve performance. Additionally, the live update is not restricted to one edit type; the edit can be one of editing an object shape, moving an object, editing a dimensional value or other types of edits. One feature of the disclosed embodiments is that "design intent" is preserved during the editing process.

Figure 4A:
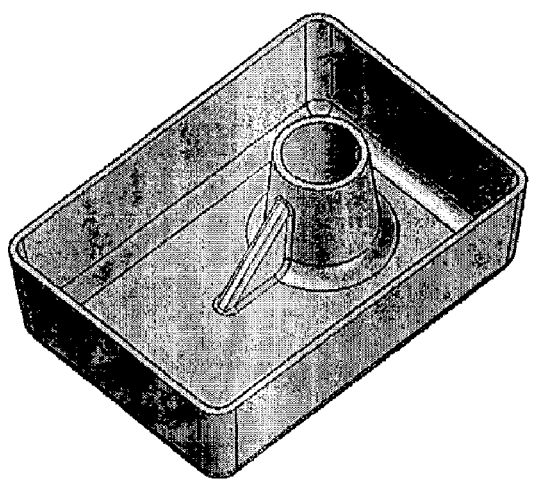
FIGS. 4A and 4B depict an exemplary edit to a graphical model in accordance with a preferred embodiment of the present invention.
Figure 4B:
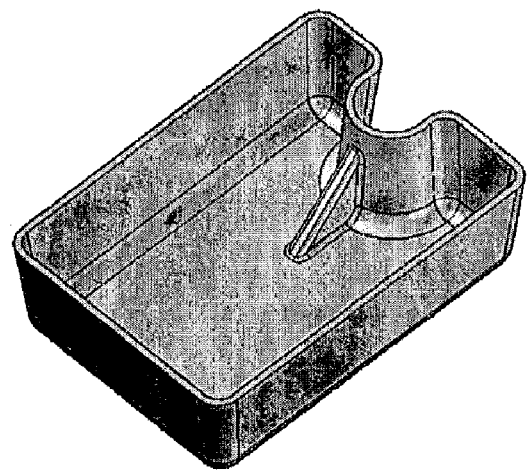

FIGS. 4A and 4B show an example of this feature. In this example, the user has asked for the system to round all corners of the model—this is his design intent. The pre-edit model for this example is shown in FIG. 4A.

FIG. 4B illustrates the model after the location of the hole has moved to intersect with the side of the original block. As the user edits the model to change it from what's shown in FIG. 4A to what's shown in FIG. 4B, new topology is introduced dynamically as he moves his mouse or other input device. This new topology automatically obeys the design rule and becomes rounded as well.

Figure 5:
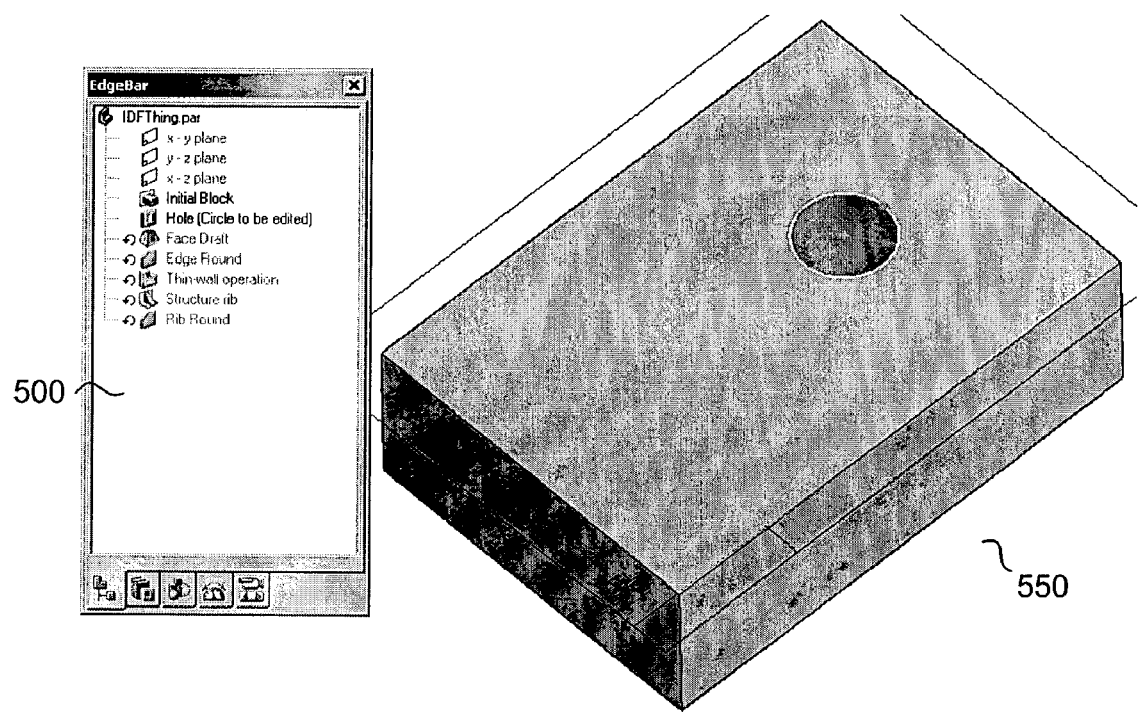
FIG. 5 illustrates a model being rolled back in dependency tree, according to conventional methods.

Conventional systems don't offer automatic updating of downstream features during profile and dimensional edits. Most systems "roll the model back" to the feature currently being edited so changes to downstream operations cannot be seen as modifications are made. FIG. 5 illustrates a model 550 being rolled back to the second of seven features, in dependency tree 500, according to conventional methods; notice that the downstream operations aren't displayed, thus geometric changes aren't computed or presented. Alternatively, some competitive systems don't roll the model back, meaning downstream features are shown, but changes made aren't automatically propagated to downstream feature until some manual update is initiated that forces a re-compute and redisplay of subsequent features.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system may conform to any of the various current implementations and practices known in the art.

It is important to note that while the present invention has been described in the context of a fully functional system, those skilled in the art will appreciate that at least portions of the mechanism of the present invention are capable of being distributed in the form of instructions contained within a machine usable medium in any of a variety of forms, and that the present invention applies equally regardless of the particular type of instruction bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs).

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for graphical editing, comprising:
    receiving a selection of a graphical element having a plurality of features including at least one downstream feature;
    receiving an event indicating the beginning of an edit process for the feature;
    displaying an updated graphical display including any graphical changes to the feature and graphical changes to at least one downstream feature of the graphical element; and
    receiving an event indicating the end of the edit process, wherein displaying the updated graphical display is repeated multiple times before receiving the event indicating the end of the edit process.

2. The method of claim 1, wherein displaying the updated graphical display takes place before receiving an event indicating the end of the edit process.

3. The method of claim 1, wherein the at least one downstream feature includes all downstream dependencies in a dependency list.

4. The method of claim 1, wherein the displaying the updated graphical display is performed as soon as constraint calculations corresponding to the edit process can be solved.

5. The method of claim 1, wherein the edit process is an interactive change to the feature.

6. The method of claim 1, wherein the displaying the updated graphical display acts as a real-time visual feedback to the edit process.

7. The method of claim 1, wherein the edit process includes dragging the location, size, or shape of the feature.

8. The method of claim 1, wherein the edit process includes dynamically incrementing a dimension value.

9. The method of claim 1, wherein the updated graphical display preserves the design intent of the feature.

10. The method of claim 1, wherein, if the edit process would result in a failure, then displaying a failure indicator.

11. A data processing system having at least a processor and accessible memory, comprising:
   means for receiving a selection of a feature of a graphical element having a plurality of features including at least one downstream feature;
   means for receiving an event indicating the beginning of an edit process for the feature;
   means for displaying an updated graphical display including any graphical changes to the feature and graphical changes to at least one downstream feature of the graphical element; and
   means for receiving an event indicating the end of the edit process, wherein the updated graphical display is displayed multiple times before receiving the event indicating the end of the audit process.

12. The data processing system of claim 11, wherein the updated graphical display is displayed before the event indicating the end of the edit process is received.

13. The data processing system of claim 11, wherein the at least one downstream feature includes all downstream features in a feature list.

14. The data processing system of claim 11, wherein the updated graphical display is displayed as soon as constraint calculations corresponding to the edit process can be solved.

15. The data processing system of claim 11, wherein the edit process is an interactive change to the feature.

16. The data processing system of claim 11, wherein the updated graphical display acts as a real-time visual feedback to the edit process.

17. The data processing system of claim 11, wherein the edit process includes dragging the location, size, or shape of the feature.

18. The data processing system of claim 11, wherein the edit process includes dynamically incrementing a dimension value.

19. The data processing system of claim 11, wherein the updated graphical display preserves the design intent of the feature.

20. The data processing system of claim 11, further comprising means for displaying a failure indicator if the edit process would result in a failure.

21. computer-readable medium encoded with computer-executable instructions, comprising:
   instructions for receiving a selection of a feature of a graphical element having a plurality of features including at least one downstream feature;
   instructions for receiving an event indicating the beginning of an edit process for the feature;
   instructions for displaying an updated graphical display including any graphical changes to the feature and graphical changes to at least one downstream feature of the graphical element; and
   instructions for receiving an event indicating the end of the edit process, wherein the updated graphical display is displayed multiple times before receiving the event indicating the end of the audit process.

22. The computer program product computer-readable medium of claim 21, wherein the updated graphical display is displayed before the event indicating the end of the edit process is received.

23. The computer-readable medium of claim 21, wherein the at least one downstream feature includes all downstream features in a feature list.

24. The computer-readable medium of claim 21, wherein the updated graphical display is displayed as soon as constraint calculations corresponding to the edit process can be solved.

25. The computer-readable medium of claim 21, wherein the edit process is an interactive change to the feature.

26. The computer-readable medium of claim 21, wherein the updated graphical display acts as a real-time visual feedback to the edit process.

27. The computer-readable medium of claim 21, wherein the edit process includes dragging the location, size, or shape of the feature.

28. The computer-readable medium of claim 21, wherein the edit process includes dynamically incrementing a dimension value.

29. The computer-readable medium of claim 21, wherein the updated graphical display preserves the design intent of the feature.

30. The computer-readable medium of claim 21, further comprising instructions for displaying a failure indicator if the edit process would result in a failure.

* * * * *